(12) United States Patent
Hollingsworth

(10) Patent No.: US 10,528,806 B2
(45) Date of Patent: Jan. 7, 2020

(54) DATA FORMAT CONVERSION

(75) Inventor: William A. Hollingsworth, Cambridge (GB)

(73) Assignee: Cynsight, LLC, Commerce, GA (US)

( * ) Notice: Subject to any disclaimer, the term of this patent is extended or adjusted under 35 U.S.C. 154(b) by 1765 days.

(21) Appl. No.: 11/479,819

(22) Filed: Jun. 30, 2006

(65) Prior Publication Data

US 2007/0009161 A1 Jan. 11, 2007

(30) Foreign Application Priority Data

Jul. 8, 2005 (GB) ..................................... 513963.9

(51) Int. Cl.
*G06K 9/00* (2006.01)

(52) U.S. Cl.
CPC ................. *G06K 9/00442* (2013.01)

(58) Field of Classification Search
CPC .......................... G06F 17/227; G06K 9/00442
USPC .......................... 715/205, 234, 236, 249–250
See application file for complete search history.

(56) References Cited

U.S. PATENT DOCUMENTS

| 5,915,001 A * | 6/1999 | Uppaluru ..................... 379/88.22 |
| 2005/0154979 A1* | 7/2005 | Chidlovskii et al. ......... 715/513 |
| 2006/0101058 A1* | 5/2006 | Chidlovskii .................. 707/102 |

FOREIGN PATENT DOCUMENTS

| EP | 0 949 571 A2 | 10/1999 | ............. G06F 17/22 |
| EP | 0 949 571 A3 | 10/1999 | ............. G06F 17/22 |
| EP | 1 221 657 A2 | 7/2002 | ............. G06F 17/21 |
| EP | 1 221 657 A3 | 7/2002 | ............. G06F 17/21 |
| EP | 1 657 649 A3 | 8/2007 | ............. G06F 17/22 |
| GB | 2 338 807 A | 12/1999 | ............. G06F 17/30 |
| WO | WO 03/054742 A2 | 7/2003 | ............. G06F 17/30 |
| WO | WO 2003/054742 A3 | 7/2003 | ............. G06F 17/30 |

OTHER PUBLICATIONS

Yip Chung et al 'Reverse Engineering for Web Data : From Visual to Semantic Structures', Proc. 18th international Conference on Data Engineering(ICDE 02), 2002, IEEE.*
Chidlovskii et al. Supervised Learning for the Legacy Document Conversion, DocEng 04, ACM, pp. 220-228.*
Chanod et al. 'From Legacy Documents to XML: A Conversion Framework', ECDL 2005, pp. 92-103.*
Chidlovskii et al., "Supervised Learning for the Legacy Document Conversion," 2004.*

(Continued)

*Primary Examiner* — Shawn S Joseph
(74) *Attorney, Agent, or Firm* — Merchant & Gould P.C.

(57) ABSTRACT

Converting intermediate document data representing document text derived from data in an image data format into a semantically-meaningful tagged text data format may be provided. Intermediate document data derived from document image data may be imputed. The intermediate document data may comprise character data corresponding to characters in the document and attribute data corresponding to one or more attributes of characters in the document. The intermediate document data may then be processed according to attribute-dependent rules. Tagged text input data may be generated comprising tagged section of the document text. The tags may define semantically meaningful portions of the text determined according to the attribute data.

16 Claims, 5 Drawing Sheets

(56) References Cited

OTHER PUBLICATIONS

Altamura et al., "Transforming paper documents into XML format with WISDOM++," 2000.*
Examination Report dated Apr. 1, 2010, in GB Appl. No. GB0513963.9.
European Search Report dated Sep. 20, 2005.
Bill Hollingsworth et al., "Retrieving Hierarchical Text Structure from Typeset Scientific Articles—a Prerequisite for E-Science Text Mining," 7 pages (pp. 267-273), Sep. 19, 2005.

* cited by examiner

DATA FORMAT CONVERSION

RELATED APPLICATION

This application claims priority benefits based on United Kingdom Patent Application No. GB0513963.9, filed Jul. 8, 2005, the technical disclosure of which is hereby incorporated herein by reference.

BACKGROUND

Conventional format conversion systems include optical character recognition (OCR) systems and systems such as those used by GOOGLE that convert document data, but not image data, in PDF format into HTML (Hyper Text Markup Language) data for display by a web browser. There exists, however, a need for a system that can input a document image and automatically read the imaged text.

SUMMARY

Data format conversion may be provided. This Summary is provided to introduce a selection of concepts in a simplified form that are further described below in the Detailed Description. This Summary is not intended to identify key features or essential features of the claimed subject matter. Nor is this Summary intended to be used to limit the scope of the claimed subject matter.

Converting intermediate document data representing document text derived from data in an image data format into a semantically-meaningful tagged text data format may be provided. Intermediate document data derived from document image data may be imputed. The intermediate document data may comprise character data corresponding to characters in the document and attribute data corresponding to one or more character attributes in the document. The intermediate document data may then be processed according to attribute-dependent rules. Tagged text input data may be generated comprising tagged section of the document text. The tags may define semantically meaningful portions of the text determined according to the attribute data.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
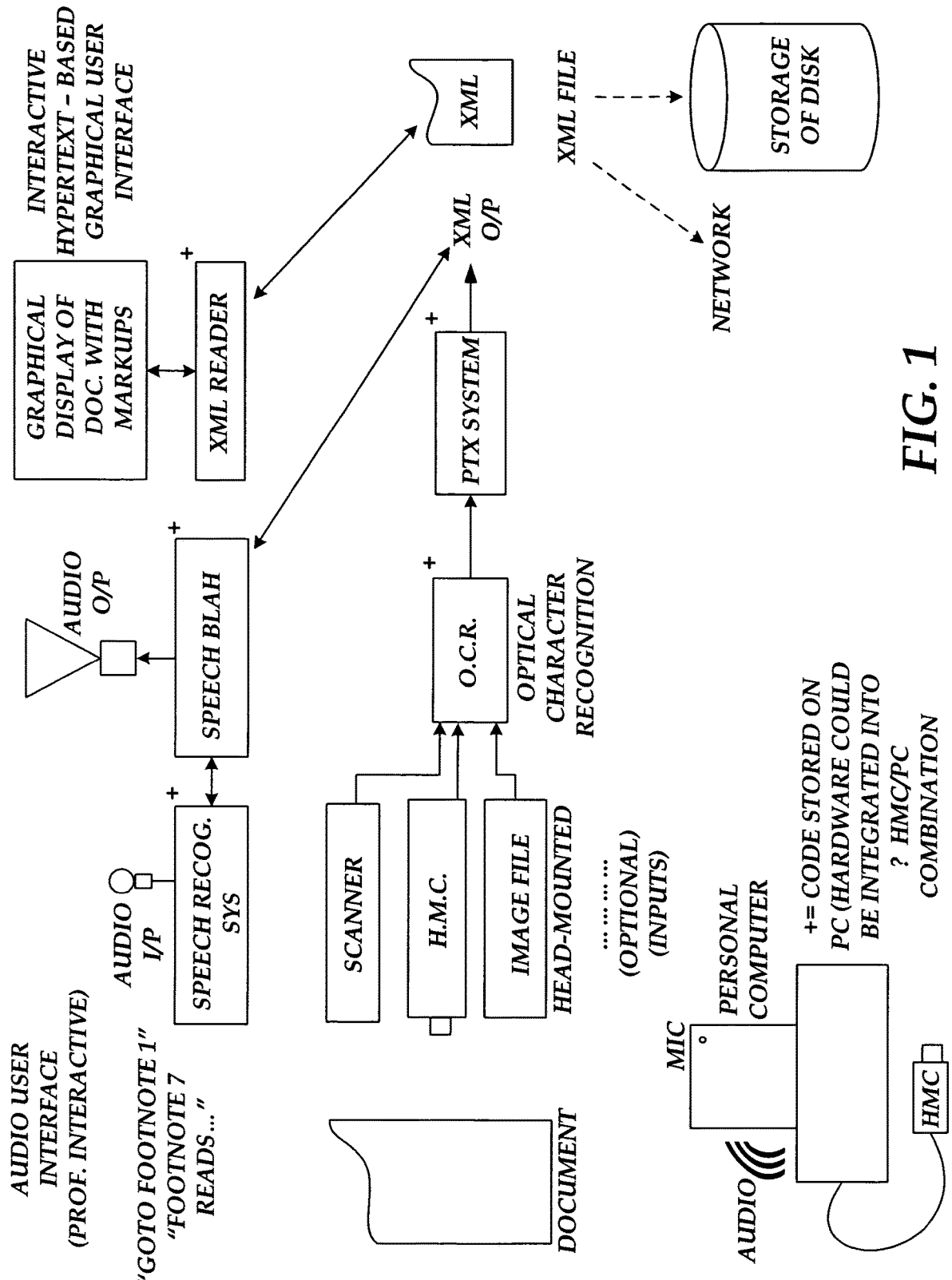
FIG. 1 shows a block diagram of a system.
Figure 2:
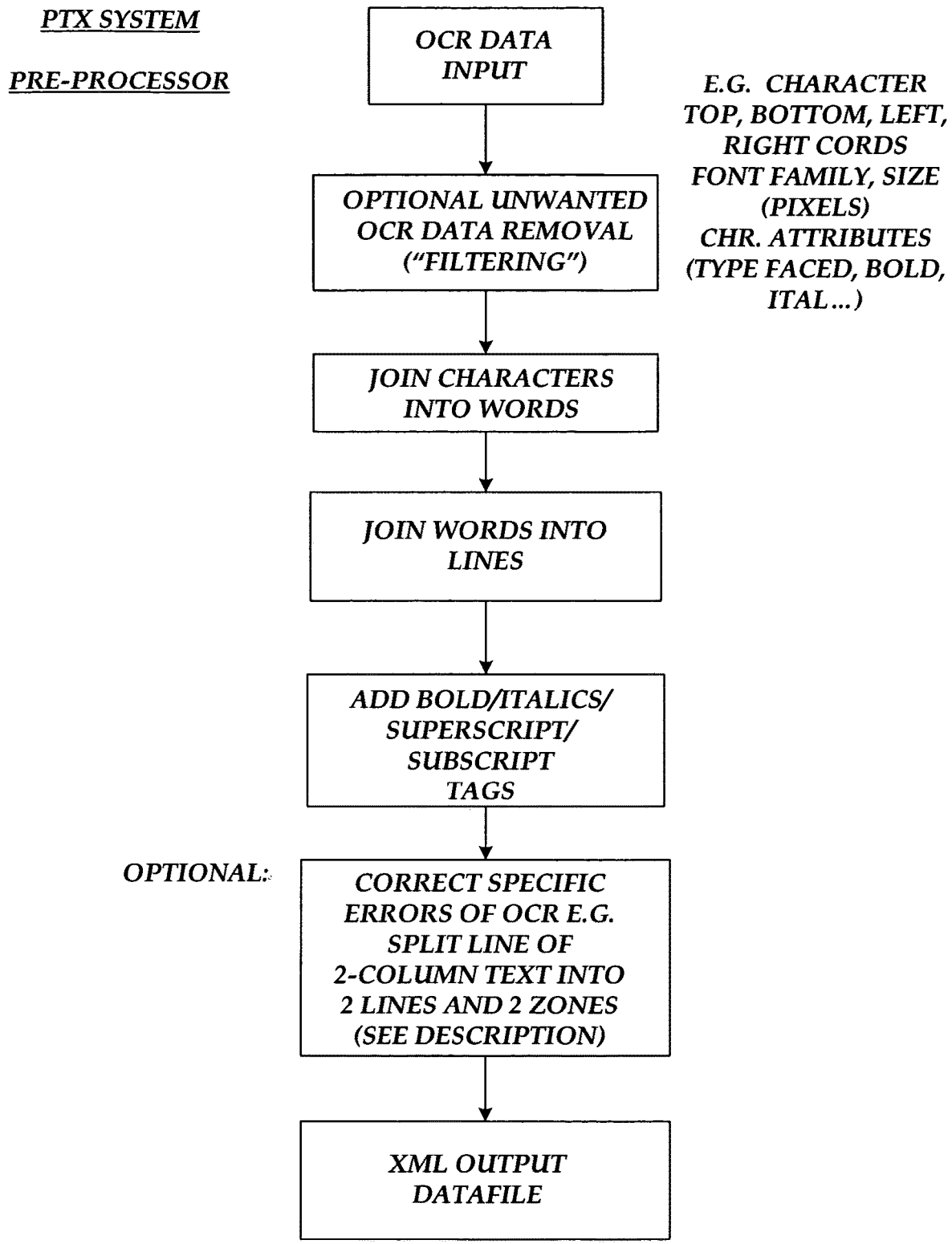
FIG. 2 shows a flow diagram of a pre-processor for the system of FIG. 1.
Figure 3:
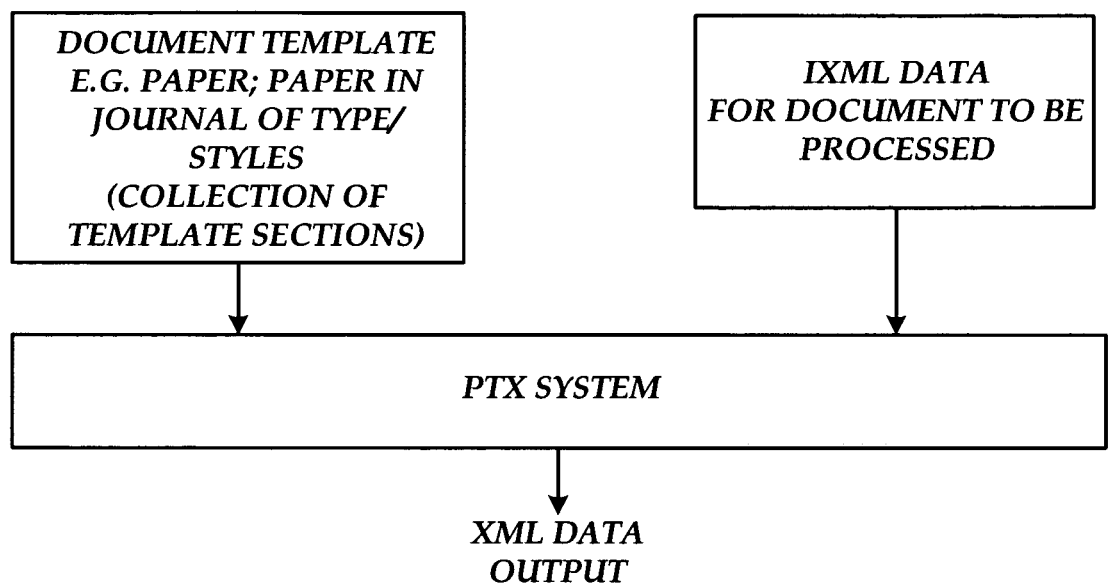
FIG. 3 shows an outline flow diagram.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

Data format conversion may be provided. Consistent with embodiments of the present invention, for example, apparatus and computer program code may be provided for converting data derived from a document image into tagged or marked up language format data suitable for machine reading. Embodiments may also include improved machine reading apparatus for the partially sighted. For example, a programming language for writing programs (called templates) may be provided for converting OCR output from, for example, PDF files (or from scanned images) into a markup language format (e.g. XML, HTML, etc.). A template may describe a typesetting format of a document, or set of similarly formatted documents. Embodiments of the invention may also include an interpreter for the template language written above. Furthermore, a computer program may be trained to write the aforementioned templates automatically.

Embodiments of the invention may comprise, but are not limited to methods or systems to aid the blind or sight impaired comprehend text. According to an embodiment of the invention, a method is provided for converting intermediate document data representing document text derived from data in an image data format into a semantically-meaningful tagged text data format. The method may comprise inputting intermediate document data derived from document image data. The intermediate document data may comprise character data corresponding to characters in the document and attribute data corresponding to one or more attributes of characters in the document. The method may further include processing the intermediate document data according to attribute-dependent rules. Moreover, the method may comprise generating tagged text data comprising tagged sections of said document text. The tags may define semantically meaningful portions of the text determined according to the attribute data.

Embodiments may include attributes of the document characters including one or more of font type, font size, line spacing, character bold, character italised, character underlined, and character position. The intermediate document data may include the character data and attribute data being generated by conventional OCR software such as that produced by Scansoft Inc. Generally, the output of such an OCR system may comprise image data (e.g. pixel information) and character data that typically comprises character position data (for example defined by left, right, top and bottom coordinates) and font data such as font size, font style and font family; a list of fonts used in the scanned document image may also be provided together with corresponding font identifiers. The OCR software may also concatenate the characters into words.

A template data file may be employed storing rule data defining a plurality of text identification rules. These rules may comprise rules for identifying a set of semantically meaningful portions of the document text, typically by operating on the document format and/or typesetting including fonts and the like. Generally, a set of rules corresponds to a particular type of document to be processed, for example., one set of rules may be employed to process a scientific paper, another to process a magazine article, another to process scanned text from a book and so forth. Consider the example of a scientific paper and identification of the abstract. If the author text has already been seen (e.g. the value of a variable SEEN_AUTHOR=1) and the first section of the paper has not yet been seen (e.g. variable FIRST_SECTION=0) and the text is in italics (e.g. variable PARAGRAPH_STYLE="ITAL") then the text may be identified as the abstract. Similarly, for example, bold text is seen after "FIGURE[number]" then the following text or paragraph can be identified as a caption and, for example, copied to a figure clipboard so that a figure list can be appended to the end of the document (in embodiments of this method images are ignored).

Embodiments of the invention may include that a particular structure is adopted in order to facilitate flexible data processing. Each rule may comprise a computer program code script that may be written in a programming language such as practical extraction report language (PERL). PERL is a programming language that combines syntax from several Unix utilities and languages. PERL is designed to handle a variety of system administrator functions and provides comprehensive string handling functions. PERL is widely used to write Web server programs for such tasks as automatically updating user accounts and newsgroup postings, processing removal requests, synchronizing databases and generating reports. While PERL may be used, it is an example and other programming languages may be used consistent with embodiments of the invention.

A pre-determined set of rules may be provided suitable for one or more document types and/or provision may be made for user addition to/modification of a set of rules. This computer program code or script may be executed to generate a set of commands, for example in a data structure such as an array. A computer program that may be thought of as a variety of interpreter or compiler, may be configured to execute these commands and hence to operate on the data derived from the document image, or more particularly on the output of an OCR process. This command processing system may also be able to set value of one or more variables according to character attribute data (position, font, style and the like), values of which are passed or accessible to a program executing a rule script. In this way, rules may include computer program code that defines an action to be taken conditional upon values of one or more of these variables, which in turn influences the set of commands generated or returned by a rule script. This provides a powerful and flexible processing approach. A set of rules or scripts may be referred to as a "template" for a document or document type.

The rules may define a hierarchy of semantically meaningful portions of the document text, for example zones, paragraphs, sentences/lines/words. In this way, the command executing code may cause the rules to be executed in a hierarchical fashion, in particular, as a tree of rule scripts, for example, starting with a first zone processing each paragraph within the zone in turn, processing each sentence or line within a paragraph in turn before proceeding back up the tree for the next paragraph or zone. A rule script may be executed either by the main command executor (e.g. "compiler", later referred to as the "PTX", pdf to XML program) or separately (for example, by a program for executing the relevant script language, such as PERL). The rules themselves may include one or more of a zone rule to identify a zone of the document text, a paragraph rule to identify a paragraph of the document text, a line rule to identify a line of the document text, a title rule to identify a title of the document text, an author rule to identify an author of the document text, a caption rule to identify a figure caption of the document text, and a footnote rule to identify a footnote of the document text. An author identification or author list, title, figure caption, footnote, abstract and the like may all be regarded as different types of document zone.

The tagged text data produced by the method may comprise data in a markup language format such as XML (Extended Markup Language). Thus, for the aforementioned example of a scientific paper, tags may be provided for title, author (including name and place such as University name), abstract and so forth. This data may be provided to a speech synthesiser for audio output and because the data is in a semantically meaningful format, a user can select which parts of the text they wish to read by information content. Thus, for example, such a system may accept and process instructions such as ignore text with a particular tag (for example ignore footnotes) or read only text with a particular tag (for example chapter heading); GOTO instructions such as GOTO the next, first or end tag of a defined or the current type may be accepted and acted upon. In this way semantically meaningful portions of the text may be identified and read or skipped past by the user. Alternatively, other tagged language formats may be employed such as LaTeX™, HTML or a text format such as rich text format (RTF) that includes commands.

Embodiments of the invention provide a data carrier carrying a template data structure. The template data structure may comprise data for a plurality of data format conversion rules for application to intermediate document data derived from document image data. The intermediate document data may comprise character data corresponding to characters in the text of the document and attribute data corresponding to one or more attributes of characters in the document. A rule may comprise data for identifying a set of characters for a portion of document text from the character attributes and/or one or more variables defined by a the rule.

As stated above, a template may be user defined or at least partially pre-determined. Some examples of rule scripts common to many types of document are a start of document rule, a zone rule, a this paragraph rule, a next paragraph rule, a this line rule, a next line rule, and an end of document rule; the template data structure preferably includes some or all of these.

Embodiments of the invention provide a method of converting a document from an image format into a semantically-meaningful format. The method may comprise receiving document image data and generating intermediate document data comprising words, lines, paragraphs and zones by generating character data corresponding to characters in the document and attribute data corresponding to one or more attributes of characters in the document and grouping the character data. The method may also include processing the intermediate document data according to format-identification rules and generating output data comprising tagged sections of text. The text may correspond to text in the document. The tags may define portions of the text determined by said attribute data and outputting the output data.

Consistent with embodiments of the invention, for each page, for each zone (where pages and one or more zones are denoted in the OCR data) the method may run a zone template that returns (PTX) commands that are executed when/where possible. Then the main (PTX) program may examine each block of text or paragraph and for each runs a "this paragraph" template or rule, which again returns a set of commands that are executed where possible. For each line in the paragraph, a "this line" rule then a "next line" rule may be executed until the end of the paragraph when a "next paragraph" rule may be executed before the procedure repeats for the next paragraph and, eventually, for the next zone. Some commands such as OPEN a tag can be executed immediately, others such as CLOSE a tag wait for their execution until the end of the relevant text (which may be temporarily copied to a clipboard). At the end, the program may run an "end of document" rule or template to tidy-up, for example, where a block or paragraph of text spans a page boundary a START-END pair of tags may be removed by an ATTACH command.

Examples of commands include: i) OPEN—opens a tag, executed immediately before text is seen; ii) CLOSE—closes a tag, executed after text is seen; iii) BE CLOSE—executed before text is seen (for example, if the abstract has been found and the author tag has not been closed then this command can be used to close the author tag before opening the abstract tag); iv) A OPEN—executed after text is seen to open a tag (for example where there are multiple authors this will not be known until at least two have been identified, in which case this command can be used to open an author list tag after, say, a title tag); v) COPY: VARIABLE_NAME—copies text to the clipboard VARIABLE_NAME (for footnotes, tables and the like); vi) SET:VARIABLE—sets a variable to a value, for example to keep track of fields seen or not seen, to compare font style, size and the like (e.g. available to a VAL command via a symbol table); vii) ATTACH—attaches the next block to a current block to give a continuous block of text; NOTAG—identifies a block of text but suppresses tagging; viii) FILTER—deletes data for an identified block, so that it is not processed (for example in the case of a scientific paper to remove a journal reference header at the top of each page); ix) PATH:TEMPLATE_NAME—in effect a GOTO for a rule script to allow one rule to invoke another directly (without going through the main PTX process); x) PASTE:VARIABLE_NAME—pastes from the clipboard VARIABLE_NAME into the XML data file; and xi) CLEAR:VARIABLE_NAME—clears the clipboard; CONDITION LEVEL—a condition upon a variable such as a named variable or an attribute, for example character or line coordinates or the like.

Embodiments of the invention provide a document data processing language comprising a set of commands. These commands may include at least OPEN a tag, CLOSE a tag, COPY text to a clipboard, SET a variable to a value, and PASTE text to a clipboard. The commands may be operable in combination on document text to convert the text into a markup language format.

Embodiment of the invention may also provide a data carrier carrying a list of at least one attribute-dependent rule for use in processing document data. The document data may comprise character data corresponding to characters in a document and attribute data corresponding to attributes of characters in the document. The rule may comprise a first portion in an imperative programming language for determining portions of the document delineated by the attribute data and a second portion in a document processing language for generating output data comprising tagged sections of text. The tags may define portions of the text delineated by the attribute data.

Embodiments of the invention may further provide a processing apparatus for converting a document from an image format into a semantically-meaningful format. The apparatus may comprise a data memory operable to store data to be processed, an instruction memory storing processor implementable instructions, and a processor operable to read and process the data in accordance with instructions stored in the instruction memory. The instructions stored in the instruction memory comprise instructions for controlling the processor to receive document image data generated from the image data intermediate document data comprising character data corresponding to characters in the document and attribute data corresponding to one or more attributes of characters in the document. The instruction may further cause the processor to process the intermediate document data according to attribute-dependent rules and generate output data comprising tagged sections of text. The text may correspond to text in the document. The tags may define semantically meaningful portions of the text determined by the attribute data.

Embodiments of the invention may also provide a machine reading apparatus including the above described processing apparatus and a speech synthesizer. The semantically meaningful portions of the text may comprise portions that are meaningful to a human such as title, author, abstract, chapter number, heading, footnote, page number, paragraph, sentence, text block, and the like document sections.

Formatting rules stored in a template file, for example, may be applied to attributes associated with characters derived by OCR from a document image to generate a tagged text data file identifying sections of a document, in particular semantically meaningful sections. Relevant portions of the document text may be associated with the identified document sections. The rules may define conditions to look for in the document and are provided from a template. An execution program may act upon the output of operation of the rules to generate the tagged document text, for example, as an XML file.

Embodiments of the invention may further provide processor control code to implement the above-described methods, in particular on a data carrier such as a disk, CD- or DVD-ROM, programmed memory such as read-only memory (e.g. firmware), or on a data carrier such as an optical or electrical signal carrier. Code (and/or data) to implement embodiments of the invention may comprise source, object or executable code in a programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language).

A method consistent with an embodiment of the invention may have three main processing stages. First, an OCR system may be used to recognize character-level information from, for example, input PDF documents. The output of the OCR may comprise, but is not limited to an XML document encoding layout information page-by-page. Within pages, there may be graphical regions or zones (detected, for example, using auto-zoning, i.e. without pre-prepared document or style specific templates) that in turn contain paragraphs and then lines and then characters. Zones may also include tables of information and images. Almost all elements may have various attributes including, for example, positioning information, and stylistic markers such as "non-bold superscript".

The second stage may comprise a generic processing stage that processes, to the OCR, output to provide IXML (intermediate XML). The second processing stage may optionally: a) filter some of the OCR output (e.g. removes unwanted OCR data); b) summarize it where appropriate (e.g. generating words from characters); c) and/or detect and corrects certain characteristic the OCR errors in its zone boundaries. For example, a line of text may, where the text is in two columns, be split into two. An example portion of IXML is given later. The result may be called "Intermediate XML" or IXML. The IXML may also build a list of all fonts used and gives each an ID for use later.

The third stage may comprise the application of a journal specific template. A template may comprise, for example, pieces of program code (e.g. PERL) that are executed during an essentially top-down left to right traversal of the parse tree of the IXML document structure. For example, one can attach program code to the "zone template" that is executed when an opening zone tag is encountered. Different code may be executed upon encountering an open paragraph tag. The code can read information about the object currently being processed (e.g. the zone, the paragraph, the line and so forth) and also any information stored away during processing so far. For example, in many journals, as in the style file for this conference paper, a change of zone is a reliable indicator of a change from the abstract to the main body text. This may be because the abstract width covers the whole page, whereas main body text is in two-column format. To encode this PTX uses: a) that we have a change of zone (information from the IXML); and that b) PTX currently believes it is processing the abstract. In other styles, the change from abstract to main text may not be indicated by a change in layout but by a stylistic cue such as a move from bold to non-bold characters and possibly only by the contents of a text line (such as "1. Introduction").

PTX may also function partly as a correction mechanism for OCR errors. For example, OCR output commonly fails to spot a small region of two column output at the foot of a page dominated by a picture and a full-width long caption. It also not uncommonly treats a full-width page heading and the second column of two column text as a single region. These errors can often be spotted and corrected, for example, by inspection of graphical co-ordinates.

One purpose of the PTX system is to convert images of documents into text together with information describing textual elements (e.g. titles, authors, section headings, footnotes, figure captions, etc.). Such information may not be explicitly encoded in a document. Rather, it is interpreted by the OCR on looking at the document (e.g. either from the typesetting layout or from the contextual information in the document).

A standard file format for representing documents is PDF. In some PDF files, strings of text from the document are stored together with their coordinates (e.g. where the text belongs graphically on the page). If the document is scanned from a printed source, then the scanned image file contains no text at all, it may contain only a photograph of text. However, the text together with the layout coordinates of the text can be approximated with high accuracy using OCR.

PTX may comprise a text conversion system for using typesetting and layout information about a document style to interpret these coordinates so that the logical text structure can be recovered. PTX may use the output of any OCR system that retains the coordinate information of the text.

Overview of Processing Stages

PTX may use OCR information to extract logical information about text elements (e.g. titles, footnotes, etc.). OCR systems can convert scanned images of documents or PDF versions of documents into text. PTX can work with any OCR system, for example, that produces text along with coordinate information (i.e. where the text appears on the page).

The following is an example of the encoding of a line of a document produced by an OCR system.

```
<word left="1032" top="13786" right="1344"
    bottom="13901">This</word>
<word left="1406" top="13786" right="2227"
    bottom="13901">illustrates</word>
<word left="2280" top="13781" right="2482"
    bottom="13901">an</word>
<word left="2539" top="13781" right="3600"
    bottom="13939">example.</word>
```

There may be two principal stages of processing in the PTX system. The first stage may use the OCR output and produces an Intermediate XML (IXML) file. The second stage may use user-defined typesetting templates to convert the IXML files into the final output.

The IXML Stage

This stage of PTX processing may assemble OCR output into lines and paragraphs. PTX may construct a list of all fonts used throughout the document and may label each line in the text with the appropriate font.

This is an example of the intermediate XML (IXML) code produced by PTX. The IXML code may be processed by a PTX template to produce the final output. A short section of IXML code is given below:

```
<zone ID="11" left="797" right="2146" top="6350" bottom="6499"
    type="text">
<par ID="13" line_spacing="228" indent="0" left="797" right="2146"
    bottom="6499">
<textline ID="18" bottom="6494" top="6350" left="797" right="2146"
    font="3" style="bold">1. Introduction</textline>
</par>
</zone>
```

The following are two example rules from a PTX template. The first one may identify a Figure in a scientific paper. The second rule extracts the caption, surrounds it by <FIGURE> . . . </FIGURE> tags, and copies it to a clipboard called figures.

```
# Find a Figure.
    if ( $Text[$pft] =~ /^Figure [0-9]+ *$/ ) {
        return ("filter",
            "set:InFig=1");
    }
# Tag a Figure caption.
    if ( val("InFig") == 1 ) {
        return ("filter",
            "open:FIGURE->figures",
            "copy:figures",
            "close: FIGURE->figures",
            "set:InFig=0");
    }
```

IXML Structure

The general structure of an IXML file, for example, is as follows:

```

<zone>
        <par>
            <textline>
            ...
            ...
            </textline>
        </par>
        ...
        ...
        <par>
            <textline>
            ...
            ...
            </textline>
        </par>
    </zone>
    ...
    ...

```

Pages

Each IXML page description may contain the page number, the length and width of the page (in pixels), and a list of all fonts used on that page that were not encountered on previous pages.

Fonts

Once a preprocessor finishes reading the IXML file for the first time, a complete list of all fonts used in the document may become available. Each font may be assigned an identifier that can be used to access each font size and font family (i.e. Times New Roman) (Figure~\ref{page}).

```

<font id="0" size="800" family="Times New Roman"/>
<font id="1" size="1800" family="Times New Roman"/>
<font id="2" size="1300" family="Ariel"/>
```

Zones

A zone may comprise a graphical region of the printed text. Inside a zone is a paragraph, inside a paragraph a line and so forth. Splitting text into zones helps to provide text to the template processing in a semantically meaningful order, for example, splitting a line across two columns into two lines in two different zones.

Each IXML zone description contains the zone number, pixel values (e.g. left, right, top, and bottom) defining the size and position of the zone, and a type attribute specifying whether the zone is composed of text, a table, or an image, as follows:
<zone
ID="1"left="673"right="8526"top="13709"bottom="13996"type="text">

Paragraphs

Each IXML paragraph description may contain the paragraph number, pixel values (e.g. left, right, top, and bottom) defining the size and position of the paragraph, the amount of space (measured in pixels) between text lines in the paragraph (called line spacing), and the degree of indentation of the first line of the paragraph relative to surrounding text.

Text-lines

Each IXML text-line description may contain the text-line number, pixel values (e.g. left, right, top, and bottom) defining the size and position of the text-line, the identifier of the font used in the text-line, and the style of the text (i.e. bold or italic).

Processing the IXML

By default (with no templates influencing processing), the PTX processor may enclose each IXML paragraph in <par> . . . </par>tags.

```
For each page...
  For each zone...
    Run zone_template
    Interpret program code returned by template
    For each paragraph...
      Run this_par_template
      Interpret program code returned by template
      For each textline...
        Run this_line_template
        Interpret program code returned by template
        Run next_line_template
        Interpret program code returned by template
      Run next_par_template (because processing of this paragraph
may be influenced by the next)
        Interpret program code returned by template
```

Figure 4:
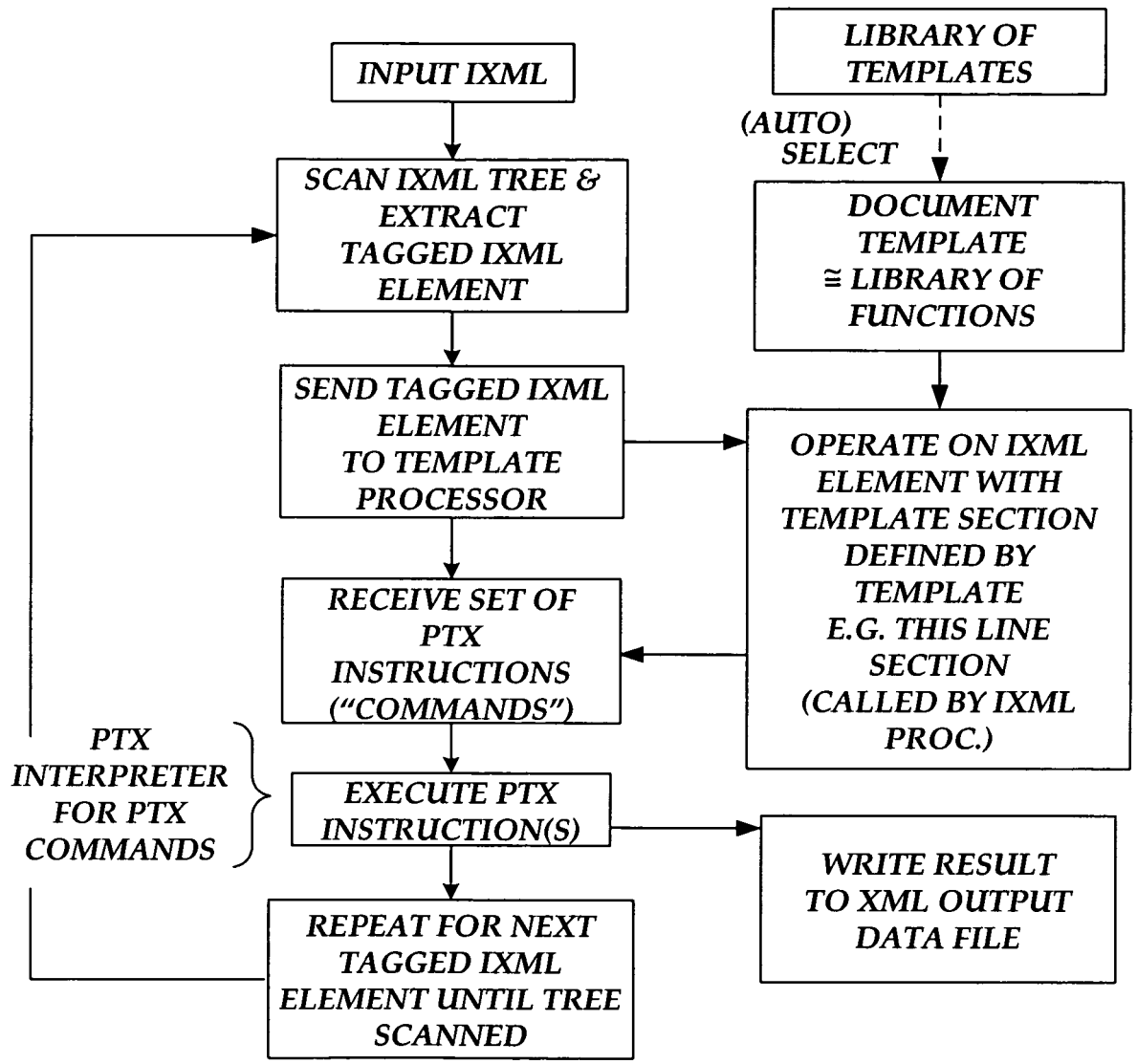
FIG. 4 shows a detailed flow diagram of the system of FIG. 3.

The above pseudo-code extract illustrates operation of the IXML processor of FIG. 4. The PTX template language is described next.

Document Arrays

The following arrays may be accessible within PTX templates (i.e. the condition part of a rule) in a template section preferably having access to the following:

Array name & Array index & Array value
\hline
ZoneTop & zone ID & top coordinate of zone
ZoneBottom & zone ID & bottom coordinate of zone
ZoneLeft & zone ID & left coordinate of zone
ZoneRight & zone ID & Right coordinate of zone
ParTop & paragraph ID & top coordinate of paragraph
ParBottom & paragraph ID & bottom coordinate of paragraph
ParLeft & paragraph ID & left coordinate of paragraph
ParRight & paragraph ID & Right coordinate of paragraph
LineTop & line ID & top coordinate of line
LineBottom & line ID & bottom coordinate of line
LineLeft & line ID & left coordinate of line
LineRight & line ID & Right coordinate of line
ZoneB(beginning) Par & zone ID & ID of beginning paragraph in zone
ZoneE (end) Par & zone ID & ID of ending paragraph in zone
ParBLine & paragraph ID & ID of beginning line in paragraph
ParELine & paragraph ID & ID of ending line in paragraph
ParStyle & paragraph ID & style of paragraph (i.e. italic, bold)
LineStyle & line ID & style of line (i.e. italic, bold)
FontSize & font ID & font pixel height
FontFamily & font ID & font family (i.e. Times New Roman)
LineFont & line ID & ID of font used in line
ParLinespacing & paragraph ID & line spacing (in pixels)

Template Variables and Functions:

Template variables can be created inside the templates to help direct the PTX processor. A template variable can be either a number or a string. In embodiments of the invention there may be two PTX functions that can be used from the condition segment of any template rule to access the template variables:

val

The val function may take a template variable name (in quotations) as an argument and returns the value of the variable.

The following is an example of a template rule that uses the val function:

not\_set

The not\_set function may take a template variable name (in quotations) as an argument. It may return the value 1 if the template variable has already been set during processing, and it may return the value 0 otherwise.

Template clipboards may be provided. In embodiments of the invention, these are represented as template variables and can use the same functions. A list of Template commands for an embodiment follows. These may be provided as the output part of a rule to the command interpreter. The command interpreter may be provided in any language to execute the commands.

aopen aopen:tagName

The above command may open a tag called <tagName>. The tag may be opened after all of the text has been processed by the current template section. This differs from the open command that opens a tag before the text has been processed by the current template section.

aopen:tagName;++counterName

Using the "++" operator with the aopen command adds an argument to the tag. The value of this argument may be increased each time the specified tag is opened with the same argument. For example, the example above may insert <tagName counterName="1"> into the output file the first time it is called. The second time it is called it may output <tagName counterName="2">.

aopen:tagName>clipboardName

The -> operator may append the new tag to the clipboard named clipboardName.

attach

The attach command may be used in the next _partemplate section and may "attach" the next paragraph to the paragraph currently being processed by performing the same processing rules on the next paragraph as the ones used for the current paragraph.

bclose bclose:tagName

The above command may close a tag called <tagName>. The tag may be closed before the text has been processed by the current template section. This differs from the close command that may close a tag after the text has been processed by the current template section.

bclose:tagName->clipboardName

The-> operator may append the closed tag to the clipboard named clipboardName.

bprint bclose:STRING

The above command may insert the string STRING before the text has been processed by the current template section.

bclose:STRING->clipboardName

The->operator may append the specified string to the clipboard named clipboard Name.

clear clear:clipboard Name

The above command may clear the clipboard named clipboardName.

close close:tagName

The above command may close a tag called <tagName>. The tag may be closed after the text has been processed by the current template section.

close:->clipboard Name

The->operator may append the closed tag to the clipboard named clipboard Name.

copy copy:clipboardName

The above command may append the text currently being processed to a clipboard named clipboardName.

filter

The filter command may instruct the PTX template processor not to output the text currently being processed.

notag

This command may only be useful in this _par_template and may instruct the PTX processor not the insert <P> . . . </P> tags around the current paragraph. This command may not be needed if the filter command or the replace command is used.

open open:tag Name

The above command may open a tag called <tagName>. The tag may be opened before the text has been processed by the current template section.

open:tagName;++counterName

Using the "++" operator with the aopen command may add an argument to the tag. The value of this argument may be increased each time the specified tag is opened with the same argument. For example, the example above may insert <tagName counterName="1"> into the output file the first time it is called. The second time it is called it may output <tagName counterName="2">.

open:tagName→clipboardName

The → operator may append the new tag to the clipboard named clipboard Name.

pass pass:templateSection

The above command may instruct the PTX template processor to skip the current template section and jump directly to the template section called templateSection.

paste paste:clipboard Name

The above command may output the contents of the clipboard named clipboard Name.

replace replace:Tag

The above command may replace the IXML tags surrounding the current text with <Tag> and </Tag> tags. For example, in the IXML structure, each paragraph may be surrounded by <par> and </par> tags.

sentence

This command may force the PTX processor to perform automatic sentence boundary detection on the text currently being processed. Each sentence may be surrounded by <S> and </S> tags.

set

This command may be used to create or change the value of a template variable.

set:variableName=Value

The above commands may set the value of the variable named variableName to Value.

Template Sections

This template may be called once at the beginning of the document. It may allow the programmer to specify a file header (i.e. name of the journal, name of the PDF file).

zone_template

The zone template may get called each time a new zone is encountered when reading the IXML file. The following are treated similarly:

```
this_par_template
this_line_template
next_line_template
next_par_template
eod_template
```

In general, a template may have multiple template sections, each comprising one or more rules and corresponding to levels in a document hierarchy or tree. A section of document text may be processed by more than one template section in a multi-tiered approach. For example, a printed line of text may be part of a sentence or an author list. The pass command can be used to pass text between template sections.

Examples of textual units processed by template section include:

Titles
Authors
Abstracts
Sections
Footnotes
Figures/tables
Page numbers/headers/footers
Bibliography Examples of template sections include:
Beginning of document (BoD)
zone (highest level on tree, graphical zone of printed page)
   this paragraph (processed under "zone", processes each line; a graphical structure)
      this line (processed under this paragraph)
      next line (may want to process next line with this line)
   next paragraph
end of document PTX may also recognize and uses text features such as Superscripts/subscripts and Bold/italic, inserting appropriate tags in the IXML structure. This may facilitate, for example, tagging and marking up footnotes and the like.

An example of two portions of a paper to be processed is given below:

Incremental Construction of Minimal Acyclic Finite-State Automata

Jan Daciuk*
   Technical University of Gdańsk
   Bruce W. Watson‡
   University of Pretoria
   Stoyan Mihov†
   Bulgarian Academy of Sciences
   Richard E. Watson§

In this paper, we describe a new method for constructing minimal, deterministic acyclic finite-state automata from a set of strings. Traditional methods consist of two phases: the first to construct a trie, the second one to minimize it. Our approach is to construct a minimal automaton in a single phase by adding new strings one by one and minimizing the resulting automaton on-the-fly. We present a general algorithm as well as a specialization that relies upon the lexicographical ordering of the input strings. Our method is fast and significantly lowers memory requirements in comparison to other methods.

1. Introduction

Finite-state automata are used in a variety of application, including aspects of natural language processing (NLP). They may store sets of words, with or without annotations such as the corresponding pronunciation, base form, or morphological categories. the main reasons for using finite-state automata in the NLP domain are that their representation of the set of words is compact, and the looking up a string in a dictionary represented by a finite-state automaton is very fast—proportional to the length of the string. Or particular interest to the NLP community are deterministic, acyclic, finite-state automata, which we call dictionaries.

References

Daciuk, Jan, Bruce W. Watson, and Richard E. Watson. 1998. Incremental construction of minimal acyclic finite state automata and transducers. In Proceedings of the International Workshop on Finite State Methods in Natural Language Processing, pages 48-56, Ankara, Turkey, 30 June-1 July.
   Hopcroft, John E. and Jeffrey D. Ullman. 1979. Introduction to Automata Theory, Languages, and Computation. Addison-Wesley, Reading, MA. Mihov Stoyan. 1998. Direct building of minimal automaton for given list. In Annuaire de l'Université de Sofia "St. Kl.
   Watson, Bruce. W. 1993?. A taxonomy of finite automata minimization algorithms. Computing Science Note 93/44, Eindhoven University of Technology, The Netherlands. Available at www.OpenFIRE.org.
   Watson, Bruce W. 1995. Taxonomies and Toolkits of Regular Language Algorithms. Ph.D. thesis, Eindhoven University of Technology, the Netherlands. Available at www.OpenFIRE.org.
   Watson, Bruce W. 1998. A fast new semi-incremental algorithm for construction of minimal acyclic DFAs. In Proceedings of the Third International Workshop on Implementing Automata, pages 121-32, Rouen, France, 17-19 September.

Examples of the XML output for the above are as follows:

```
<?xml version="1.0" encoding="UTF-8" ?>
<PAPER>
  <METADATA>
    <FILENO>J00-1002</FILENO>
    <APPEARED>
      <CONFERENCE>Computational Linguistics</CONFERENCE>
      <YEAR>2000</YEAR>
    </APPEARED>
  </METADATA>
  <TITLE>Incremental Construction of Minimal Acyclic Finite-State
    Automata</TITLE>
  <AUTHORLIST>
    <AUTHOR ID="1">
      <NAME>Jan Daciuk*</NAME>
      <PLACE>Technical University of Gdansk</PLACE>
    </AUTHOR>
    <AUTHOR ID="2">
      <NAME>Bruce W. Watson$</NAME>
      <PLACE>University of Pretoria</PLACE>
    </AUTHOR>
    <AUTHOR ID="3">
      <NAME>Stoyan Mihovt</NAME>
      <PLACE>Bulgarian Academy of Sciences</PLACE>
    </AUTHOR>
    <AUTHOR ID="4">
      <NAME>Richard E. Watson§</NAME>
    </AUTHOR>
  </AUTHORLIST>
  <ABSTRACT>
    <S ID="S-1">In this paper, we describe a new method for constructing
      minimal, deterministic, acyclic finite-state automata from a set of
      strings.</S>
```

```
    <S ID="S-2">Traditional methods consist of two phases: the first to
      construct a trie, the second one to minimize it.</S>
    <S ID="S-3">Our approach is to construct a minimal automaton in a
      single phase by adding new strings one by one and minimizing the
      resulting automaton on-the-fly.</S>
    <S ID="S-4">We present a general algorithm as well as a specialization
      that relies upon the lexicographical ordering of the input strings.</S>
    <S ID="S-5">Our method is fast and significantly lowers memory
      requirements in comparison to other methods.</S>
  </ABSTRACT>
  <BODY>
    <DIV>
      <HEADER ID="1">1. Introduction</HEADER>
      <P>
        <S ID="S-6">Finite-state automata are used in a variety of
          applications, including aspects of natural language processing
          (NLP).</S>
        <S ID="S-7">They may store sets of words, with or without
          annotations such as the corresponding pronunciation, base
          form, or morphological categories.</S>
        <S ID="S-8">The main reasons for using finite-state automata
          in the NLP domain are that their representation of the set of
          words is compact, and that looking up a string in a dictionary
          represented by a finite-state automaton is very fast-
          proportional to the length of the string.</S>
        <S ID="S-9">Of particular interest to the NLP community are
          deterministic, acyclic, finite-state automata, which we call
          dictionaries.</S>
      </P>
...
    <DIV>
      <HEADER ID="10">Conclusions</HEADER>
      <P>
        <S ID="S-300">We have presented two new methods for
          incrementally constructing a minimal, deterministic, acyclic
          finite-state automaton from a finite set of words (possibly with
          corresponding annotations).</S>
        <S ID="S-301">Their main advantage is their minimal
          intermediate memory requirements.'</S>
        <S ID="S-302">The total construction time of these minimal
          dictionaries is dramatically reduced from previous
          algorithms.</S>
        <S ID="S-303">The algorithm constructing a dictionary from
          sorted data can be used in parallel with other algorithms that
          traverse or utilize the dictionary, since parts of the dictionary
          that are already constructed are no longer subject to future
          change.</S>
      </P>
      <P style="bold">
        <S ID="S-304">Acknowledgments</S>
      </P>
      <P>
        <S ID="S-305">Jan Daciuk would like to express his gratitude to
          the Swiss Federal Scholarship Commission for providing a
          scholarship that made possible the work described here.</S>
        <S ID="S-306">Jan would also like to thank friends from ISSCO,
          Geneva, for their comments and suggestions on early versions
          of the algorithms given in this paper.</S>
      </P>
      <P>
        <S ID="S-307">Bruce Watson and Richard Watson would like to
          thank Ribbit Software Systems Inc. for its continued support in
          these fields of applicable research.</S>
      </P>
      <P>
        <S ID="S-308">All authors would like to thank the anonymous
          reviewers and Nanette Saes for their valuable comments and
          suggestions that led to significant improvements in the
          paper.</S>
      </P>
    </DIV>
  </BODY>
  <REFERENCELIST>
    <REFERENCE ID="1">Daciuk, Jan, Bruce W. Watson, and Richard E.
      Watson. 1998. Incremental construction of minimal acyclic finite state
      automata and transducers. In Proceedings of the International
      Workshop on Finite State Methods in Natural Language Processing,
      pages 48–56, Ankara, Turkey, 30 June–1 July.</REFERENCE>
```

-continued

```
    <REFERENCE ID="3">Hopcroft, John E. and Jeffrey D. Ullman. 1979.
        Introduction to Automata Theory, Languages, and Computation.
        Addison-Wesley, Reading, MA.</REFERENCE>
    <REFERENCE ID="4">Mihov, Stoyan. 1998. Direct building of minimal
        automaton for given list. In Annuaire de l'Universite de Sofia "St. Kl.
        Ohridski", volume 91, book 1, pages 38–40. Faculte de Mathematique et
        Informatique, Sofia, Bulgaria, livre 1 edition, February. Available at
        http://lml.bas.bg/,-,stoyan publications.html.</REFERENCE>
    <REFERENCE ID="6">Moll, Robert N., Michael A. Arbib, and A. J. Kfoury.
        1988. Introduction to Formal Language Theory. Springer Verlag, New
        York, NY.</REFERENCE>
    <REFERENCE ID="7">Revuz, Dominique. 1991. Dictionnaires et lexiques:
        methodes et algorithmes. Ph.D. thesis, Institut Blaise Pascal, Paris,
        France. LITP 91.44.</REFERENCE>
    <REFERENCE ID="8">Watson, Bruce W. 1993a. A taxonomy of finite
        automata construction algorithms. Computing Science Note 93/43,
        Eindhoven University of Technology, The Netherlands. Available at
        www.OpenFIRE.org.</REFERENCE>
    <REFERENCE ID="9">Watson, Bruce W. 1993b. A taxonomy of finite
        automata minimization algorithms. Computing Science Note 93/44,
        Eindhoven University of Technology, The Netherlands. Available at
        www.OpenFIRE.org.</REFERENCE>
    <REFERENCE ID="10">Watson, Bruce W. 1995. Taxonomies and Toolkits
        of Regular Language Algorithms. Ph.D. thesis, Eindhoven University of
        Technology, the Netherlands. Available at
        www.OpenFIRE.org.</REFERENCE>
    <REFERENCE ID="11">Watson, Bruce W. 1998. A fast new semi-
        incremental algorithm for construction of minimal acyclic DFAs. In
        Proceedings of the Third International Workshop on Implementing
        Automata, pages 121–32, Rouen, France, 17–19
        September.</REFERENCE>
</REFERENCELIST>
<FOOTNOTELIST>
    <FOOTNOTE>* Department of Applied Informatics, Technical University of
        Gdansk, Ul. G. Narutowicza 11/12, PL80-952 Gdansk, Poland. E-mail:
        jandac@pg.gda.pl</FOOTNOTE>
    <FOOTNOTE>† Linguistic Modelling Laboratory, LPDP-Bulgarian Academy
        of Sciences, Bulgaria. E-mail: stoyan@lml.bas.bg</FOOTNOTE>
    <FOOTNOTE>$ Department of Computer Science, University of Pretoria,
        Pretoria 0002, South Africa. E-mail: watson@cs.up.ac.za</FOOTNOTE>
    <FOOTNOTE>§ E-mail: watson@OpenFIRE.org</FOOTNOTE>
</FOOTNOTELIST>
<FIGURELIST>
    <FIGURE>A trie whose language is the French regular endings of verbs of
        the first group.</FIGURE>
    <FIGURE>The unique minimal dictionary whose language is the French
        regular endings of verbs of the first group.</FIGURE>
    <FIGURE>The result of blindly adding the word bae to a minimized
        dictionary (appearing on the left) containing abd and bad. The
        rightmost dictionary inadvertently contains abe as well. The lower
        dictionary is correct-state 3 had to be cloned.</FIGURE>
    <FIGURE>Consider an automaton (shown in solid lines on the left-hand
        figure) accepting abcde and fghde. Suppose we want to add fghdghde.
        As the common prefix path (shown in thicker lines) contains a
        confluence state, we clone state 5 to obtain state 9, add the suffix to
        state 9, and minimize it. When we also consider the dashed lines in the
        left-hand figure, we see that state 8 became a new confluence state
        earlier in the common prefix path. The right-hand figure shows what
        could happen if we did not rescan the common prefix path for
        confluence states. State 10 is a clone of state 4.</FIGURE>
</FIGURELIST>
</PAPER>
```

A portion of the IXML output from the PTX pre-processor is shown below:

```
<?xml version="1.0" encoding="ISO-8859-1"?>
<!--Intermediate XML document generated by PTX (Cynsight, LLC.)-->
<document>

<fontspec id="0" size="800" family="Times New Roman"/>
<fontspec id="1" size="1800" family="Times New Roman"/>
<fontspec id="2" size="1300" family="Times New Roman"/>
<fontspec id="3" size="1100" family="Times New Roman"/>
<fontspec id="4" size="1000" family="Times New Roman"/>
<zone ID="1" left="673" right="8526" top="13709" bottom="13996" type="text">
```

```
<par ID="1" line_spacing="180" indent="0" left="816" right="4426"
bottom="13939">
<textline ID="1" bottom="13896" top="13781" left="816" right="4426"
font="0">(c) 2000 Association for Computational Linguistics</textline>
</par>
</zone>
<zone ID="2" left="673" right="8526" top="860" bottom="11558" type="text">
<par ID="2" line_spacing="396" indent="0" left="763" right="6624"
bottom="1253">
<textline ID="2" bottom="1248" top="979" left="763" right="6624" font="1"
style="bold">Incremental Construction of Minimal</textline>
</par>
<par ID="3" line_spacing="396" indent="0" left="763" right="5410"
bottom="1738">
<textline ID="3" bottom="1646" top="1402" left="763" right="5410" font="1"
style="bold">Acyclic Finite-State Automata</textline>
</par>
</zone>
<zone ID="3" left="763" right="2002" top="2434" bottom="2659" type="text">
<par ID="4" line_spacing="288" indent="0" left="763" right="2002">
<textline ID="4" bottom="2659" top="2434" left="763" right="2002" font="2">Jan
Daciuk*</textline>
</par>
</zone>
<zone ID="4" left="4829" right="6379" top="2414" bottom="2664" type="text">
<par ID="5" line_spacing="288" indent="0" left="4829" right="6379"
bottom="2664">
<textline ID="5" bottom="2611" top="2414" left="4829" right="6379"
font="2">Stoyan Mihovt</textline>
</par>
</zone>
<zone ID="5" left="773" right="3576" top="2702" bottom="2909" type="text">
<par ID="6" line_spacing="228" indent="0" left="773" right="3576">
<textline ID="6" bottom="2909" top="2702" left="773" right="3576"
font="3">Technical University of Gdansk</textline>
</par>
</zone>
<zone ID="6" left="4829" right="7627" top="2688" bottom="2899" type="text">
<par ID="7" line_spacing="228" indent="0" left="4829" right="7627"
bottom="2899">
<textline ID="7" bottom="2856" top="2688" left="4829" right="7627"
font="3">Bulgarian Academy of Sciences</textline>
</par>
</zone>
<zone ID="7" left="778" right="2650" top="3206" bottom="3384" type="text">
<par ID="8" line_spacing="288" indent="0" left="778" right="2650">
<textline ID="8" bottom="3384" top="3206" left="778" right="2650"
font="2">Bruce W. Watson$</textline>
</par>
</zone>
<zone ID="8" left="4829" right="6859" top="3187" bottom="3370" type="text">
<par ID="9" line_spacing="288" indent="0" left="4829" right="6859"
bottom="3370">
<textline ID="9" bottom="3379" top="3187" left="4829" right="6859"
font="2">Richard E. Watson§</textline>
</par>
</zone>
<zone ID="9" left="773" right="2707" top="3475" bottom="3682" type="text">
<par ID="10" line_spacing="228" indent="0" left="773" right="2707"
bottom="3682">
<textline ID="10" bottom="3629" top="3475" left="773" right="2707"
font="3">University of Pretoria</textline>
</par>
</zone>
<zone ID="10" left="754" right="8419" top="4277" bottom="6072" type="text">
<par ID="11" line_spacing="252" indent="0" left="754" right="8419"
bottom="6072">
<textline ID="11" bottom="4449" top="4277" left="778" right="8400" font="4"
style="italic">In this paper, we describe a new method for constructing
minimal, deterministic, acyclic finite-</textline>
<textline ID="12" bottom="4714" top="4541" left="782" right="8419" font="4"
style="italic">state automata from a set of strings. Traditional methods
consist of two phases: the first to construct</textline>
<textline ID="13" bottom="4973" top="4805" left="782" right="8405" font="4"
style="italic">a trie, the second one to minimize it. Our approach is to
construct a minimal automaton in a</textline>
<textline ID="14" bottom="5232" top="5059" left="782" right="8410" font="4"
style="italic">single phase by adding new strings one by one and minimizing
the resulting automaton on-the-</textline>
```

```
<textline ID="15" bottom="5496" top="5323" left="754" right="8414" font="4"
style="italic">fly. We present a general algorithm as well as a specialization
that relies upon the lexicographical</textline>
<textline ID="16" bottom="5755" top="5587" left="787" right="8405" font="4"
style="italic">ordering of the input strings. Our method is fast and
significantly lowers memory requirements</textline>
<textline ID="17" bottom="6014" top="5861" left="792" right="3326" font="4"
style="italic">in comparison to other methods.</textline>
</par>
<par ID="12" line_spacing="228">
</par>
</zone>
<zone ID="11" left="797" right="2146" top="6350" bottom="6499" type="text">
<par ID="13" line_spacing="228" indent="0" left="797" right="2146"
bottom="6499">
<textline ID="18" bottom="6494" top="6350" left="797" right="2146" font="3"
style="bold">1. Introduction</textline>
</par>
<par ID="14" line_spacing="228">
</par>
</zone>
<zone ID="12" left="792" right="8424" top="6797" bottom="8664" type="text">
<par ID="15" line_spacing="228" indent="0" left="792" right="8424"
bottom="8664">
<textline ID="19" bottom="6964" top="6797" left="792" right="8419"
font="3">Finite-state automata are used in a variety of applications,
including aspects of natural</textline>
<textline ID="20" bottom="7205" top="7042" left="797" right="8419"
font="3">language processing (NLP). They may store sets of words, with or
without annotations</textline>
<textline ID="21" bottom="7445" top="7272" left="797" right="8424"
font="3">such as the corresponding pronunciation, base form, or morphological
categories. The</textline>
<textline ID="22" bottom="7680" top="7512" left="797" right="8424"
font="3">main reasons for using finite-state automata in the NLP domain are
that their repre-</textline>
<textline ID="23" bottom="7920" top="7752" left="802" right="8419"
font="3">sentation of the set of words is compact, and that looking up a
string in a dictionary</textline>
<textline ID="24" bottom="8155" top="7987" left="802" right="8419"
font="3">represented by a finite-state automaton is very fast-proportional to
the length of the</textline>
<textline ID="25" bottom="8400" top="8227" left="806" right="8424"
font="3">string. Of particular interest to the NLP community are
deterministic, acyclic, finite-</textline>
<textline ID="26" bottom="8640" top="8486" left="806" right="4632"
font="3">state automata, which we call dictionaries.</textline>
</par>
</zone>
...
<par ID="233" line_spacing="228" indent="0" left="974" right="1858"
bottom="5414">
<textline ID="587" bottom="5410" top="5280" left="974" right="1858"
font="4">References</textline>
</par>
<par ID="234" line_spacing="228" indent="0" left="970" right="3768"
bottom="5683">
<textline ID="588" bottom="5650" top="5515" left="970" right="3768"
font="4">Daciuk, Jan, Bruce W. Watson, and</textline>
</par>
<par ID="235" line_spacing="192" indent="0" left="1147" right="4555"
bottom="7094">
<textline ID="589" bottom="5847" top="5712" left="1147" right="4147"
font="4">Richard E. Watson. 1998. Incremental</textline>
<textline ID="590" bottom="6048" top="5914" left="1152" right="4555"
font="4">construction of minimal acyclic finite state</textline>
<textline ID="591" bottom="6244" top="6110" left="1152" right="4440"
font="4">automata and transducers. In Proceedings</textline>
<textline ID="592" bottom="6441" top="6312" left="1147" right="4421" font="8"
style="italic">of the International Workshop on Finite State</textline>
<textline ID="593" bottom="6643" top="6509" left="1147" right="4205" font="8"
style="italic">Methods in Natural Language Processing, </textline>
<textline ID="594" bottom="6840" top="6710" left="1147" right="4330"
font="4">pages 48–56, Ankara, Turkey, 30 June-1</textline>
<textline ID="595" bottom="7042" top="6912" left="1147" right="1478"
font="4">July.</textline>
</par>
<par ID="236" line_spacing="192" indent="-216" left="974" right="4248"
bottom="7886">
```

```
<textline ID="596" bottom="7238" top="7109" left="974" right="4248"
font="4">Hopcroft, John E. and Jeffrey D. Ullman.</textline>
<textline ID="597" bottom="7435" top="7306" left="1157" right="4070" font="8"
style="italic">1979. Introduction to Automata Theory,</textline>
<textline ID="598" bottom="7632" top="7502" left="1152" right="3322" font="8"
style="italic">Languages, and Computation.</textline>
<textline ID="599" bottom="7834" top="7704" left="1152" right="3658"
font="4">Addison-Wesley, Reading, MA.</textline>
</par>
<par ID="237" line_spacing="192" indent="-216" left="974" right="4152"
bottom="8482">
<textline ID="600" bottom="8035" top="7901" left="974" right="4138"
font="4">Mihov, Stoyan. 1998. Direct building of</textline>
<textline ID="601" bottom="8232" top="8102" left="1157" right="4104"
font="4">minimal automaton for given list. In</textline>
<textline ID="602" bottom="8434" top="8299" left="1147" right="4152" font="8"
style="italic">Annuaire de l'Universite de Sofia "St. Kl.</textline>
</par>
</zone>
<zone ID="100" left="4961" right="8678" top="1302" bottom="8566" type="text">
<par ID="238" line_spacing="192" indent="0" left="5208" right="8606"
bottom="2347">
<textline ID="603" bottom="1498" top="1368" left="5213" right="8606"
font="4">Ohridski", volume 91, book 1, pages 38–40.</textline>
...
<textline ID="636" bottom="8064" top="7930" left="5222" right="7987" font="8"
style="italic">Proceedings of the Third International</textline>
<textline ID="637" bottom="8266" top="8136" left="5237" right="8573" font="8"
style="italic">Workshop on Implementing Automata, pages</textline>
<textline ID="638" bottom="8462" top="8333" left="5237" right="8510"
font="4">121–32, Rouen, France, 17–19 September.</textline>
</par>
</zone>

</document>
```

A portion of a skeleton template that may be used to process the paper is also shown below. The conditions (rules) are, in this example, written in PERL. The output is PTX script for a PTX interpreter and is provided by return (" . . . "). In practice, more rules may be added according to the precise format of a paper to be processed for improved performance:

```
#!/usr/bin/perl
sub zone_template {
  my $page = shift(@_);
  my $zone = shift(@_);
  return ( );
}
sub this_par_template {
  my $page = shift(@_);
  my $zone = shift(@_);
  my $par = shift(@_);
  my $pl = $ParLine[$par];
  my $pfl = $ParFLine[$par];
  if ( !$pl ) {
    return ("filter");
  }
# filter page numbers
  if ( $par == $PageLowestpar[$page]
       && $Text[$pl] =~ /^[0-9 ]+$/ ) {
    return ("filter");
  }
# TITLE
  if ( $LineStyle[$pl] eq "bold"
       && not_set("SeenTitle") ) {
    return ("replace:TITLE",
            "set:TitleFont=$LineFont[$pl]",
            "set:SeenTitle=1",
            "aopen:AUTHORLIST");
  }
# AUTHOR PLACE
  if ( val("InAuthor") == 1 ) {
    return ("pass:line");
  }
# ABSTRACT
  if ( $LineStyle[$pl] eq "bold"
       && not_set("InAbstract")
       && $pl == $pfl
       && $Text[$pl] =~ /^[ ]*Abstract[ ]*$/ ) {
    return ("bclose:AUTHORLIST",
            "set:SeenAuthors=1",
            "filter",
            "open:ABSTRACT",
            "set:InAbstract=1");
  }
# ATHOR NAME
  if ( $LineStyle[$pl] eq "bold"
       && val("SeenTitle") == 1
       && val("InAuthor") <= 0
       && not_set("SeenAuthors") ) {
    return ("open:AUTHOR",
            "pass:line");
  }
# KEYWORDS
  if ( val("InAbstract") == 1
       && $Text[$pl] =~ /^[ ]*Key[ ]*words:/ ) {
    return ("bclose:ABSTRACT",
            "replace:KEYWORDS",
            "aopen:BODY",
            "set:InAbstract=0",
            "set:SeenAbstract=1");
  }
# introduction
  if ( val("InAbstract") == 1
       && $pl == $pfl
       && $Text[$pl] =~ /Introduction/ ) {
    return ("bclose:ABSTRACT",
            "open:BODY",
            "open:DIV",
            "replace:HEADER",
```

```
                "set:SecFont=$LineFont[$pl]",
                "set:InAbstract=0",
                "set:SeenIntro=1",
                "set:SeenAbstract=1");
    }
    if ( val("InAbstract") == 1
            && $pl == $pfl
            && not_set("SecFont") ) {
        return ("bclose:ABSTRACT",
                "open:BODY",
                "open:DIV",
                "replace:HEADER",
                "set:SecFont=$LineFont[$pl]",
                "set:InAbstract=0",
                "set:SeenIntro=1",
                "set:SeenAbstract=1");
    }
    if ( val("InAbstract") == 1 ) {
        return("set:TextFont=$LineFont[$pl]",
                "notag");
    }
# section
    if ( val("SeenAbstract") == 1
            && not_set("SeenIntro")
            && $LineStyle[$pl] eq "bold"
            && $pl == $pfl ) {
        return ("open:DIV",
                "replace:HEADER",
                "set:SecFont=$LineFont[$pl]",
                "set:SeenIntro=1");
    }
# REFERENCELIST
    if ( $pl == $pfl
            && $Text[$pl] =~ /^ *References */ ) {
        return ("bclose:DIV",
                "bclose:BODY",
                "open:REFERENCELIST",
                "filter",
                "set:InReflist=1");
    }
# section
    if ( #$LineStyle[$pl] eq "bold"
            val("SeenIntro") == 1
            && $FontSize[$LineFont[$pl]] > $FontSize[val("TextFont")]
#           && val("SecFont") == $LineFont[$pl]
            && $pl == $pfl ) {
        return ("bclose:DIV",
                "open:DIV",
                "replace:HEADER");
    }
# first REFERENCE, remember font
    if ( val("InReflist") == 1
            && not_set("RefFont") ) {
        return ("replace:REFERENCE;++ID",
                "set:RefFont=$LineFont[$pl]",
                "set:RefLeft=$LineLeft[$pl]");
    }
# REFERENCE
    if ( val("InReflist") == 1 ) {
        return ("replace:REFERENCE;++ID",
                "set:RefLeft=$LineLeft[$pl]");
    }
    return ( );
}
sub this_line_template {
    my $par = shift(@_);
    my $line = shift(@_);
# ATHOR NAME
    if ( $LineStyle[$line] eq "bold"
            && val("SeenTitle") == 1
            && val("TitleFont") != $LineFont[$line]
            && val("InAuthor") <= 0
            && not_set("SeenAuthors") ) {
        return ("replace:NAME",
                "set:InAuthor=1");
    }
# AUTHOR PLACE
    if ( val("InAuthor") == 1
            && val("TitleFont") != $LineFont[$line]
            && val("InPlace") <= 0 ) {
        return ("open:PLACE",
                "notag",
                "set:InPlace=1");
    }
# AUTHOR PLACE
    if ( val("InPlace") == 1
            && val("TitleFont") != $LineFont[$line]
            && ( $Text[$line] =~ /@/
                || $Text[$line] =~ /\.edu/ ) ) {
        return ("close:PLACE",
                "close:AUTHOR",
                "set:InPlace=0",
                "set:InAuthor=0");
    }
# AUTHOR PLACE
    if ( val("InPlace") == 1
            && val("TitleFont") != $LineFont[$line]
            && $Text[$line] !~ /@/ ) {
        return ("notag");
    }
    return ( );
}
sub next_line_template {
    my $par = shift(@_);
    my $line = shift(@_);
    return ( );
}
sub next_par_template {
    my $par = shift(@_);
    my $zone = shift(@_);
    my $page = shift(@_);
    my @this_set = split(/ /, shift(@_));
    my $pl = $ParLine[$par];
    my $npl = $ParLine[$par+1];
    if ( val("InReflist") == 1
            && $LineLeft[$npl] - $LineLeft[$pl] > 100 ) {
        return ("attach");
    }
    return ( );
}
sub eod_template {
    return ( );
}
1;
```

All rights including copyrights in the code included herein are vested in and the property of the Applicant. The Applicant retains and reserves all rights in the code included herein, and grants permission to reproduce the material only in connection with reproduction of the granted patent and for no other purpose.

Consistent with embodiments of the invention, applications of PTX include speech synthesis, text-mining, information extraction, information retrieval and text skimming. Moreover, although an example of the application of the above described processing system to automatic reading of an imaged document has been described many other applications are possible, in particular in the fields of information extraction and text mining.

An embodiment consistent with the invention may be implemented within a system for converting intermediate document data representing document text derived from data in an image data format into a semantically-meaningful tagged text data format. The system, may include a processor in which the invention may be embodied. The processor may comprise a memory storage and a processing unit coupled to the memory storage. The processing unit may be operative to input intermediate document data derived from document image data. The intermediate document data may comprise character data corresponding to characters in the document and attribute data corresponding to one or more attributes of characters in the document. Furthermore, the processing unit may be operative to process the intermediate document data according to attribute-dependent rules. In addition, the processing unit may be operative to generate tagged text data comprising tagged sections of the document text. The tags may define semantically meaningful portions of the text determined according to the attribute data.

Consistent with an embodiment of the present invention, the aforementioned memory, processing unit, and other components may be implemented within a system for providing data format conversion. Any suitable combination of hardware, software, and/or firmware may be used to implement the memory, processing unit, or other components. By way of example, the memory, processing unit, or other components may be implemented with processor 500 shown in FIG. 5.

Figure 5:
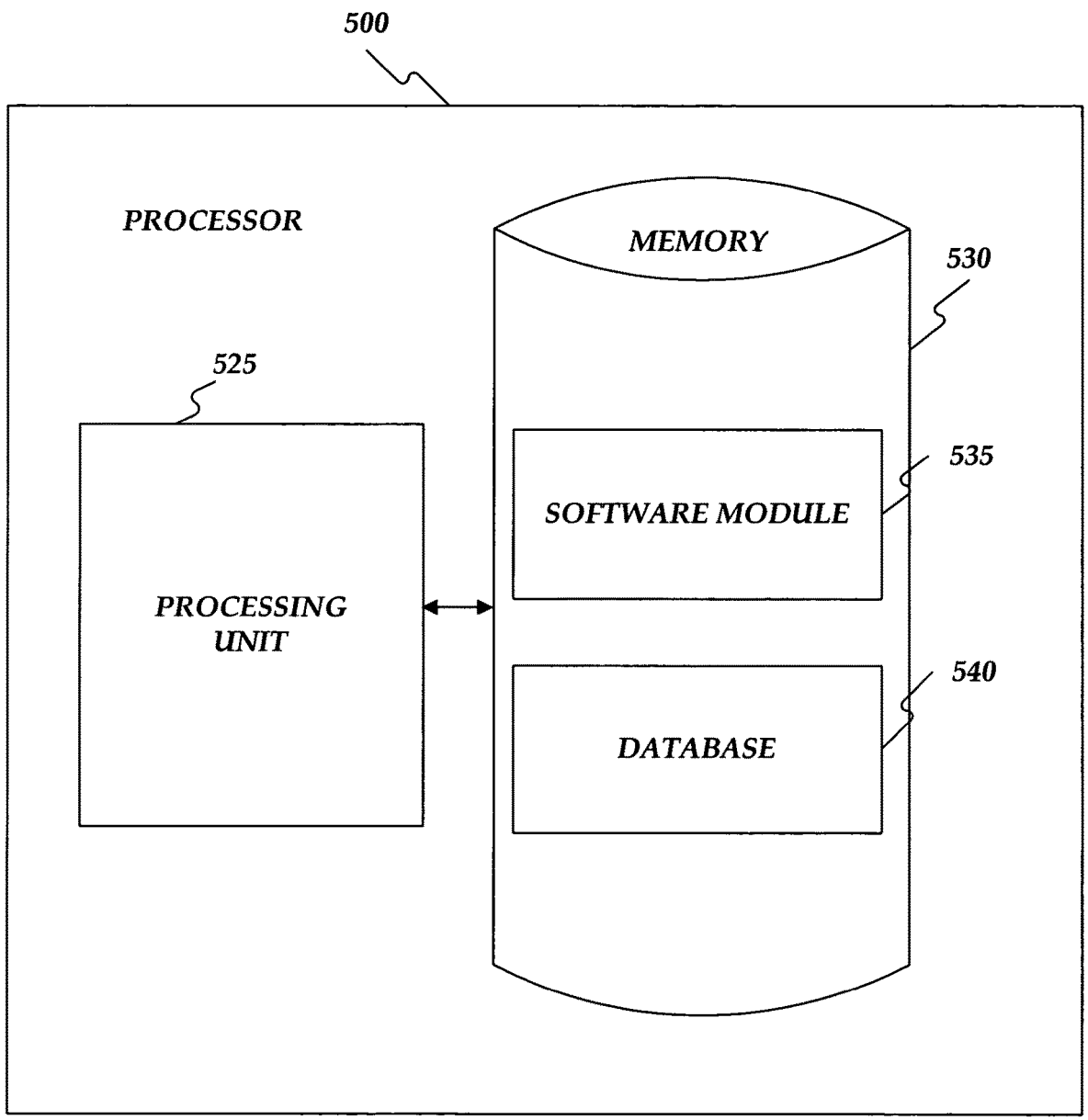
FIG. 5 shows a processor.

As shown in FIG. 5, processor 500 may include a processing unit 525 and a memory 530. Memory 530 may include a software module 535 and a database 540. While executing on processing unit 525, software module 535 may perform any process including, for example, any process (or sub-part of any process) described above for providing data format conversion. Database 540 may be used, for example, to temporarily store various information while executing one or more stages of any process described above.

Processor 500 ("the processor") may be implemented using a personal computer, network computer, mainframe, or other similar microcomputer-based workstation. The processor may though comprise any type of computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, a WiFi access point, or a facsimile machine. The aforementioned systems and devices are exemplary and the processor may comprise other systems or devices.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. Accordingly, the present invention may be embodied in hardware and/or in software (including firmware, resident software, microcode, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method of converting intermediate document data representing document text derived from data in an image data format into a semantically-meaningful tagged text data format, the method comprising:
   providing a user-defined template defining a plurality of attribute-dependent rules, the user-defined template derived from a set of documents;
   inputting intermediate document data derived from document image data of a document of the set of documents, said intermediate document data comprising character data corresponding to characters in the document and attribute data corresponding to at least one attribute of characters in the document;
   processing the intermediate document data according to the attribute-dependent rules of the template, wherein processing the intermediate document data according to the attribute-dependent rules of the template comprises:
      dividing the character data into a plurality of page zones, wherein each of the plurality of page zones comprises a zone description comprising a zone number, values defining the size and position of the zone, and a type attribute specifying whether the zone is composed of text, a table or an image, and examining the character data of each of the plurality of page zones; and
      generating tagged text data comprising tagged sections of said document text, the tags defining semantically meaningful portions of said text determined according to said attribute data.

2. The method of claim 1 wherein said attributes of characters in the document include one or more of font type, font size, line spacing, character bold, character italicized, character underlined, and character position.

3. The method of claim 1 wherein said processing comprises:
   reading said intermediate document data; and
   operating on data derived from said intermediate document data using rule data defining a plurality of text identification rules, said rules comprising rules for identifying a set of semantically meaningful portions of said document text, to generate said tagged text data.

4. The method of claim 3 wherein said rule data for a said rule comprises computer program code for identifying a set of characters for a said portion of document text from at least one of said character attributes and one or more variables defined by a said rule, and wherein said user-defined template is based on other than said document image data.

5. The method of claim 4 wherein said operating comprises causing said program code to be executed, said code including code to generate one or more commands dependent upon one or more variables dependent upon a said character attribute; and then executing said commands.

6. The method of claim 5 wherein said commands include one or more commands to set values of one or more of said variables dependent upon a said character attribute.

7. The method of claim 3 wherein at least some of said rules define a hierarchy of semantically meaningful portions of said document text.

8. The method of claim 3 wherein said rules include one or more of a zone rule to identify a zone of said document text, a paragraph rule to identify a paragraph of said document text, a line rule to identify a line of said document text, a title rule to identify a title of said document text, an author rule to identify an author of said document text, a caption rule to identify a figure caption of said document text, and a footnote rule to identify a footnote of said document text.

9. The method of claim 3 further comprising inputting user data to define one or more of said rules of a template data file.

10. The method of claim 1 wherein said tagged text data comprises data in a markup language format.

11. The method of claim 1 further comprising converting said tagged text data to speech data for audio output.

12. The method of claim 11 further comprising selecting from among said semantically meaningful portions of text, portions to convert to said speech data.

13. The method of claim 1 further comprising inputting said document image data, and generating said intermediate document data from said document image data, wherein generating said intermediate data comprises dividing said document image data into the plurality of zones, wherein each of the plurality of zones comprises at least one of the following: a plurality of character data comprising a homogenous font size, a plurality of character data comprising a predominant font size, a paragraph, a column, a footer, a header, a character, and a line.

14. A method of converting a document from an image format into a semantically-meaningful format, the method comprising:
   providing a user-defined template defining a plurality of format-identification rules, the user-defined template derived from a set of documents;
   receiving document image data of a document of the set of documents;
   generating intermediate document data comprising words, lines, paragraphs and zones by generating character data corresponding to characters in the document and attribute data corresponding to one or more attributes of characters in the document and grouping said character data;
   processing the intermediate document data according to the format-identification rules of the template and generating output data comprising tagged sections of text, the text corresponding to text in said document, the tags defining portions of said text determined by said attribute data, wherein processing the intermediate document data according to the format-identification rules of the template comprises:
      dividing the character data into a plurality of page zones, wherein each of the plurality of page zones comprises a zone description comprising a zone number, values defining the size and position of the zone, and a type attribute specifying whether the zone is composed of text, a table or an image,
      examining the character data of each of the plurality of page zones, and
      generating tagged text data comprising tagged sections of said document text, the tags defining semantically meaningful portions of said text determined according to said attribute data; and
      outputting said output data in response to matching the intermediate document data with the format-identification rules of the template.

15. An apparatus for converting a document from an image format into a semantically-meaningful format, the apparatus comprising:
   a data memory operable to store data to be processed;
   an instruction memory storing processor implementable instructions; and a processor operable to read and process the data in accordance with instructions stored in the instruction memory;

wherein the instructions stored in the instruction memory comprise instructions for controlling the processor to:
providing a user-defined template defining a plurality of attribute-dependent rules, the user-defined template derived from a set of documents;
receive document image data of a document of the set of documents;
generating from said image data intermediate document data comprising character data corresponding to characters in the document and attribute data corresponding to one or more attributes of characters in the document;
process the intermediate document data according to the attribute-dependent rules of the template and generate output data comprising tagged sections of text, the text corresponding to text in said document, the tags defining semantically meaningful portions of said text determined by said attribute data and wherein being operative to process the intermediate document data according to the attribute-dependent rules of the template comprises being operative to:
divide the character data into a plurality of page zones, each of the plurality of page zones comprising at least one semantically meaningful portion of said text, and each of the plurality of page zones further comprising a zone description comprising a zone number, values defining the size and position of the zone, and a type attribute specifying whether the zone is composed of text, a table or an image,
examine the character data of each of the plurality of page zones, and
generating tagged text data comprising tagged sections of said document text, the tags defining semantically meaningful portions of said text determined according to said attribute data; and
output said output data.

16. The apparatus of claim 15 further comprising a speech synthesizer configured to receive said output data and to convert said output data to audio speech data.

* * * * *